United States Patent Office 2,715,649
Patented Aug. 16, 1955

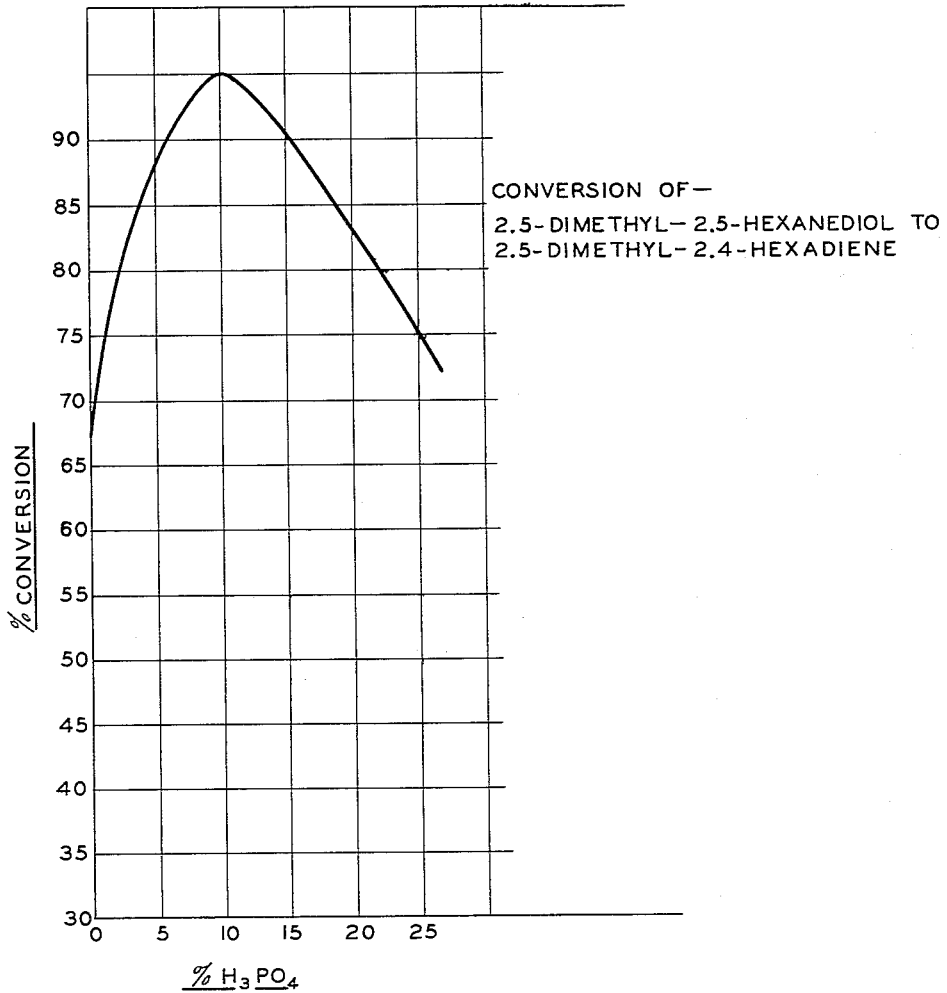

2,715,649

CATALYTIC DEHYDRATION OF A HEXANEDIOL TO A HEXADIENE

John A. S. Hammond, Baltimore, Md., assignor, by mesne assignments, to Food Machinery and Chemical Corporation, New York, N. Y., a corporation of Delaware Application July 26, 1952, Serial No. 301,105

3 Claims. (Cl. 260—681)

This invention relates to the preparation of 2,5-dimethyl-2,4-hexadiene and provides an improved process whereby this compound may, with advantage, be prepared from 2,5-dimethyl-2,5-hexanediol.

The 2,5-dimethyl-2,4-hexadiene, prepared in accordance with my present invention, is a useful intermediate in the preparation of other organic compounds and is especially useful in the synthesis of chrysanthemum monocarboxylic acid, a material of great value in the manufacture of certain insecticides.

The over-all reaction, which in accordance with my present invention is carried out in the presence of a catalyst, may be represented by the following equation:

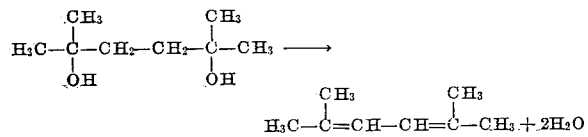

As indicated by the foregoing equation, the reaction involves dehydration of, or the removal of the elements of water from, the hexanediol molecule. Many materials have been proposed as catalysts for use in dehydration reactions. Catalytic agents of this sort are generally highly specific and while functioning with satisfaction in the removal of the elements of water from a particular chemical compound or under a given set of conditions, are not useful with compounds of different structure or under a different set of conditions. In the instant case it is necessary that the dehydration be carried out with a minimum of decomposition of the hexanediol to gaseous or tarry products and also that the reaction proceeds under conditions affording the maximum of economy.

It is an object of my present invention to provide an economically feasible process for converting 2,5-dimethyl-2,5-hexanediol to 2,5-dimethyl-2,4-hexadiene.

A further object of the invention is to provide an improved catalyst of high specificity for promoting the desired reaction, while minimizing undesirable side reactions.

A still further object is to provide such a catalyst effective to promote a high rate of reaction at relatively low reaction temperatures.

These and other desirable objects are accomplished by my present invention, as will be apparent from the following detailed description thereof.

I have found that activated alumina will promote, to some extent, the conversion of 2,5-dimethyl-2,5-hexanediol to 2,5-dimethyl-2,4-hexadiene by passing the former in contact with a bed of the activated alumina at a temperature in excess of 350° C. I have further found that this conversion is effected to a comparable extent where there is used as the catalyst a substantially anhydrous solid prepared by treating the activated alumina with 25% or more of phosphoric acid by weight. However, quite surprisingly, I have found that where the proportion of phosphoric acid used in treating the activated alumina is decreased to about 10% by weight, the over-all conversion and conversion rate, even at a materially decreased temperature, are greatly increased.

More particularly, I have found that when no phosphoric acid is present, that is, when activated alumina is used alone as the catalyst, the conversion is only about 67% complete, even under high temperature conditions of the order of 375° C., and that, even under such high temperature conditions, the reaction rate is very low. Where the activated alumina had been treated with about 25% phosphoric acid, the reaction temperature may be somewhat reduced, but under optimum conditions a conversion of only about 75% was obtained. However, by using as the catalyst a substantially anhydrous solid prepared, as hereinafter described, by treating the activated alumina with about 10% by weight of the phosphoric acid, a conversion of over 90% of the 2,5-dimethyl-2,5-hexanediol was obtained, even at a substantially lower temperature and at a conversion rate more than four times that obtained using a catalyst prepared by treating the activated alumina with 25% of phosphoric acid.

Predicated upon this discovery, my present process comprises the passing of the 2,5-dimethyl-2,5-hexanediol in vapor form in contact with a substantially anhydrous catalyst, prepared by treating activated alumina with orthophosphoric acid as hereinafter described, heated to a temperature within the range of about 200–300° C., the proportion of phosphoric acid used in treating the alumina being within the range of about 5% to about 20% by weight.

I have found that the most highly effective catalyst is one prepared by treating the activated alumina with about 10% orthophosphoric acid. However, this proportion may with advantage be varied within the range extending from as low as about 5% to as high as about 20%, more advantageously within the range of about 6% to about 15.

Activated alumina used in accordance with the present invention is a porous, granular form of aluminum oxide ($Al_2O_3$), such as has been extensively used commercially as an absorbent for the drying of liquids and gases and as a catalyst or catalyst carrier in petroleum and other chemical reactions. It does not soften, swell, or disintegrate when immersed in water. The activated alumina used in carrying out the tests, hereinafter described, was of the following composition:

| | Percent |
|---|---|
| Alumina | 96.00 |
| Soda ($Na_2O$) less than | 0.10 |
| Silica ($SiO_2$) less than | 0.10 |
| Titania ($TiO_2$) | 0.02 |
| Iron oxide ($Fe_2O_3$) | 0.05 |
| Moisture (loss on ignition) | 3.00 |

The density in pounds per cubic foot was approximately 55. It will be understood that the invention is not restricted to the use of the particular activated alumina of the above composition but that generally available commercial grades of activated alumina may be used.

The catalyst was prepared by the following method. To a weighed amount of the activated alumina just described, there was added the desired quantity of phosphoric acid, diluted with sufficient water to uniformly wet the alumina. Following uniform wetting, the mixture was heated on a steam bath, with stirring, to insure uniform distribution of the liquid over the solid phase until superficially dried. The acid treated alumina was then heated for about 30 minutes at a temperature of about 220° C. to insure complete dehydration, and was then ready for use. The phosphoric acid used in preparing the catalyst was the ordinary commercial grade 85% orthophosphoric acid. However, reference to amounts or proportions of phosphoric acid herein and in the appended claims will be understood to mean 100% phosphoric acid.

I am, at present, unable to state with certainty, the precise composition of the catalyst used in my process. The extent to which the phosphoric acid and activated alumina may interact, or the ultimate composition of the catalyst after subjection to the reaction temperature, are not known. However, catalysts consistently effective in carrying out the process may be prepared as described above and knowledge of their precise composition is not essential.

The relationship of catalytic effectiveness in my process to the proportion of phosphoric acid used in preparing the catalyst is illustrated by the curve shown in the accompanying drawing and prepared by plotting the percentage of phosphoric acid used in treating the activated alumina against the present conversion of the 2,5-dimethyl-2,5-hexanediol to 2,5-dimethyl-2,4-hexadiene. It will be observed that a maximum conversion is reached at about 10% phosphoric acid and that percent conversion drops off rapidly as the proportion of phosphoric acid is either increased or decreased. A conversion as low as 80% is considered tolerable in this field, but a conversion of about 90% or better is presently essential for economically commercial operations. Conversions of 90% or higher are obtained when the proportion of phosphoric acid is within the range of about 6% to 15%.

The reaction has been successfully carried out in a vertically positioned pyrex glass tube, about 30 inches long and about ¾ inch internal diameter, the mid-portion of the tube being heated by two electric heaters surrounding the mid-portion of the tube, each about 12 inches long. The temperature of the reactor was measured by suitably placed thermocouples. A column of about 210 grams of the catalyst was placed in the tube, the tube and catalyst therein heated to a predetermined temperature and liquid 2,5-dimethyl-2,5-hexanediol was fed at a predetermined rate into a heating flask, vaporized therein and the vapors passed downwardly through the the heated catalyst bed in the tube. Vapors issuing from the lower end of the reaction tube were passed through a water cooled condenser and the condensate collected in a glass receiving flask. The condensate, on standing, separated to form a water layer and an oil layer.

The process will be further described and illustrated by the following specific examples. It will be understood, however, that these examples are for purposes of illustration and are not to be considered limitative.

Example

In this example, the catalyst used was prepared from the previously described activated alumina and 10%, by weight, of orthophosphoric acid, as follows:

60 grams of phosphoric acid, 600 grams of 4–8 mesh activated alumina and about 200 cc. of water, were well mixed in a container and the mixture evaporated to dryness over a steam bath with frequent stirring. When dry, about 210 grams of the catalyst was placed in the previously described glass tube and heated by means of the electric heaters, previously described, to about 200° C. for one-half hour, before starting the feed of the 2,5-dimethyl-2,5-hexanediol. The latter was then fed at the desired rate into a heated glass flask and flash distilled into the upper end of the reaction tube.

The operation was carried on for 36 hours. The temperature at each of the heating units was read and recorded every four hours and the amounts of water and oil layers accumulated during the preceding four hour period were also measured and the refractive index of the oil layer determined as indicative of the extent of the conversion.

The temperature, feed rate, and percentage conversion are set forth in the following tabulation:

TABLE 1

| Time | Temperature, ° C., at heater— | | Feed Rate, cc./hr. | Percent Conversion |
|---|---|---|---|---|
| | #1 | #2 | | |
| 12 m | 217 | 266 | | |
| 4 a. m | 260 | 277 | 235 | 91.0 |
| 8 a. m | 249 | 260 | 275 | 93.0 |
| 12 n | 225 | 233 | 341 | 91.0 |
| 4 p. m | 232 | 242 | 213 | 91.0 |
| 8 p. m | 228 | 239 | 227 | 91.0 |
| 12 m | 231 | 239 | 332 | 92.0 |
| 4 a. m | 235 | 255 | 293 | 94.0 |
| 8 a. m | 236 | 250 | 280 | 95.0 |
| 12 n | 232 | 242 | 238 | 95.0 |

The percent conversion figures of the foregoing tabulation were calculated from the refractive indices of the respective oil layers, the refractive index $n_D^{25}$ of the hexanediol compound being 1.4269 and that of the hexadiene compound being 1.4752.

The hexanediol compound boils at about 200° C. and the boiling point of the hexadiene compound is about 134.5° C. Therefore, it was possible to make a fairly close separation of the oil layer by fractional distillation. By the distillation method, the over-all conversion of the 2,5-dimethyl-2,5-hexanediol to 2,5-dimethyl-2,4-hexadiene was determined to be about 83%. There was no evidence of the formation of non-condensible gaseous by-products.

For the purpose of appraising and illustrating the advantages of my process, a series of comparative tests were run using various catalysts and temperatures and feed rates found to be optimum for the particular catalyst used, other conditions being as previously described. In the first of these tests, the activated alumina of the type previously noted, was used alone as the catalyst and, in the remaining tests, the activated alumina treated with various proportions of orthophosphoric acid, as previously described, was used as the catalyst. The operating conditions, identity of the catalyst and percentage conversions of these comparative tests are set forth in the following tabulation.

TABLE II

| Catalytic Material | Temp. of Reactor, ° C. | Feed Rate, cc./hr. | Conversion to Hexadiene, Percent |
|---|---|---|---|
| Activated Alumina alone | 375 | 67 | 67.5 |
| Activated Alumina + 5% H₃PO₄ | 285 | 101 | 88 |
| Activated Alumina + 10% H₃PO₄ | 237 | 376 | 95 |
| Activated Alumina + 20% H₃PO₄ | 243 | 220 | 80 |
| Activated Alumina + 25% H₃PO₄ | 293 | 120 | 77.5 |

From the data given in Table II, it is apparent that, when using activated alumina alone, a relatively high reaction temperature and a low feed rate are required to give even a 67.5% conversion, but when using a catalyst treated with 5% orthophosphoric acid, the percent conversion is increased by almost ⅓, even at a substantially higher feed rate and a much lower conversion temperature. Both of these conditions are even further improved when the proportion of orthophosphoric acid used in treating the activated alumina is raised to 10%. Less favorable results are obtained as the proportion of phosphoric acid used in treating the activated alumina is further increased, until at 25%, the percent conversion approaches that obtained when activated alumina alone was used. Proportions of phosphoric acid in excess of about 20% cease to be commercially practical.

Activated alumina treated with less than about 5% phosphoric acid has also been found unsuitable as a catalyst in my present process because of the high reaction temperature required and the low percent conversion, even at low feed rates.

Where the proportion of phosphoric acid used in preparing the catalyst is kept within the range from about 5% to about 20%, the formation of non-condensible gaseous products and the formation of objectionable amounts of tarry by-products are avoided.

I claim:

1. A process for converting 2,5-dimethyl-2,5-hexanediol to 2,5-dimethyl-2,4-hexadiene which comprises passing the 2,5-dimethyl-2,5-hexanediol in vapor form in contact with a catalyst, prepared by treating activated alumina with orthophosphoric acid, and heated to a temperature within the range of 200° to 300° C., the amount of phosphoric acid with which the alumina is treated being within the range of 5% to 20% by weight of the alumina.

2. The process of claim 1 in which the catalyst used is one in which the proportion of phosphoric acid used in treating the alumina is within the range of 6% to 15%.

3. The process of claim 1 in which the catalyst used is composed of activated alumina which has been treated with 10% by weight of orthophosphoric acid and the reaction temperature is about 250° C.

References Cited in the file of this patent

UNITED STATES PATENTS

| | | |
|---|---|---|
| 1,923,569 | Mueller-Cunradi | Aug. 22, 1933 |
| 1,944,153 | Mueller-Cunradi | Jan. 23, 1934 |